US009389317B2

(12) United States Patent  (10) Patent No.: US 9,389,317 B2
Zhang et al.  (45) Date of Patent: Jul. 12, 2016

(54) METHOD AND APPARATUS FOR DETERMINING POSITION IN A GLOBAL NAVIGATION SATELLITE SYSTEM

(71) Applicant: Marvell World Trade Ltd., St. Michael (BB)

(72) Inventors: Wentao Zhang, Cupertino, CA (US); Zhike Jia, Fremont, CA (US)

(73) Assignee: Marvell World Trade LTD., St. Michael (BB)

( * ) Notice: Subject to any disclaimer, the term of this patent is extended or adjusted under 35 U.S.C. 154(b) by 495 days.

(21) Appl. No.: 13/898,779

(22) Filed: May 21, 2013

(65) Prior Publication Data

US 2013/0314276 A1  Nov. 28, 2013

Related U.S. Application Data

(60) Provisional application No. 61/650,946, filed on May 23, 2012, provisional application No. 61/791,872, filed on Mar. 15, 2013.

(51) Int. Cl.
  *G01S 19/42* (2010.01)
  *G01S 19/25* (2010.01)
  *G01S 19/05* (2010.01)

(52) U.S. Cl.
  CPC ............... *G01S 19/42* (2013.01); *G01S 19/258* (2013.01); *G01S 19/05* (2013.01)

(58) Field of Classification Search
  CPC ....... G01S 19/42; G01S 19/25; G01S 19/258; G01S 19/05
  USPC ........................................ 342/357.25, 357.64
  See application file for complete search history.

(56) References Cited

U.S. PATENT DOCUMENTS

| 2003/0069033 | A1* | 4/2003 | Edge | H04B 7/2693 455/502 |
| 2005/0037775 | A1* | 2/2005 | Moeglein | G01S 5/0036 455/456.1 |
| 2007/0001901 | A1 | 1/2007 | Yeh et al. | |
| 2007/0024498 | A1 | 2/2007 | Korneluk et al. | |
| 2009/0213906 | A1* | 8/2009 | Schmid | G01S 19/24 375/147 |
| 2011/0201347 | A1* | 8/2011 | Abraham | H04W 48/18 455/456.1 |

(Continued)

FOREIGN PATENT DOCUMENTS

| WO | WO 03077757 A1 * | 9/2003 | ........... A61B 5/0066 |
| WO | WO-2009080064 A1 | 7/2009 | |

OTHER PUBLICATIONS

PCT International Search Report of corresponding PCT Application No. PCT/US2013/042006; Jul. 31, 2013; 5 pages.

*Primary Examiner* — Harry Liu

(57) ABSTRACT

A system for determining a position of a device, the system including a receiver module, a communication module, and a location determining module. The receiver module respectively acquires signals from a plurality of satellites totaling in number less than five. The communication module obtains, from a server, via a cellular network or a wireless network, ephemeris data corresponding to one or more of the plurality of satellites. The location determining module determines the position of the device based, at least in part, on (i) the signals acquired from the plurality of satellites, and (ii) the ephemeris data corresponding to the one or more of the plurality of satellites obtained from the server. The position of the device is further determined without a priori knowledge regarding the position of the device.

14 Claims, 3 Drawing Sheets

(56) References Cited

U.S. PATENT DOCUMENTS

2011/0317570 A1* 12/2011 Likar .................. G01S 1/68 370/252

2012/0172051 A1* 7/2012 Jeong .................. G01S 1/70 455/456.1

* cited by examiner

METHOD AND APPARATUS FOR DETERMINING POSITION IN A GLOBAL NAVIGATION SATELLITE SYSTEM

CROSS-REFERENCE TO RELATED APPLICATIONS

This application claims the benefit of U.S. Provisional Application No. 61/650,946, filed on May 23, 2012 and U.S. Provisional Application No. 61/791,872, filed on Mar. 15, 2013. The entire disclosure of the application referenced above is incorporated herein by reference.

FIELD

The present disclosure relates generally to a global navigation satellite system, and more particularly to techniques and apparatus for determining position in a global navigation satellite system.

BACKGROUND

A global navigation satellite system (GNSS) is a satellite-based navigation system used to determine a position (or a geographic location) of a receiver on Earth. The Global Positioning System (GPS) is an example of a GNSS. The GPS includes a constellation of 24 satellites (21 GPS satellites and three spare satellites) that orbit the Earth at 10,600 miles above the Earth. The satellites are spaced so that from any point on Earth, at least four satellites will be above the horizon. The satellites enable a receiver to determine a position (e.g., a geographic location) of the receiver. In commercial applications, the accuracy of a determined position can vary between 100 meters to 10 meters from an actual position of a receiver. In other applications requiring more precision— e.g., military applications, survey applications, or the like— the accuracy of a determined position can be within one meter from an actual position of a receiver.

Each satellite includes a computer, an atomic clock, and a radio. With knowledge of its own orbit and clock, each satellite periodically broadcasts its position and time. Each satellite transmits signals (referred to herein as "satellite signals") at precise intervals. On the ground, a receiver includes a computer that converts information received in the satellite signals into data including position, velocity, and time estimates. Using the data received from a given satellite, a receiver can calculate a position of the given satellite, and the distance between given satellite and the receiver. Accordingly, the receiver can then use triangulation or other techniques to determine a position of the receiver by obtaining similar information from a number of other satellites.

SUMMARY

A system for determining a position of a device is disclosed. The system comprises a receiver module, a communication module, and a location determining module. The receiver module is configured to respectively acquire signals from a plurality of satellites totaling in number less than five. The communication module is configured to obtain, from a server, ephemeris data corresponding to one or more of the plurality of satellites totaling in number less than five. The ephemeris data corresponding to the one or more of the plurality of satellites totaling in number less than five is obtained by the communication module from the server via (i) a cellular network or (ii) a wireless network. The location determining module is configured to determine the position of the device based, at least in part, on (i) the signals acquired from the plurality of satellites totaling in number less than five, and (ii) the ephemeris data corresponding to the one or more of the plurality of satellites totaling in number less than five obtained from the server. The position of the device is further determined without a priori knowledge regarding the position of the device.

In other features, a method for determining a position of a device is disclosed. The method comprises respectively acquiring signals from a plurality of satellites totaling in number less than five. The method further comprises obtaining, from a server, ephemeris data corresponding to one or more of the plurality of satellites totaling in number less than five. The ephemeris data corresponding to the one or more of the plurality of satellites totaling in number less than five is obtained from the server via (i) a cellular network or (ii) a wireless network. The method further comprises determining the position of the device based, at least in part, on (i) the signals acquired from the plurality of satellites totaling in number less than five, and (ii) the ephemeris data corresponding to the one or more of the plurality of satellites totaling in number less than five obtained from the server. The position of the device is further determined without a priori knowledge regarding the position of the device.

One or more potential advantages of the techniques and apparatus disclosed herein include one or more of the following. In one aspect, as explained below in detail, the systems and methods of the present disclosure improve Time To First Fix (TTFF) using measurements derived from a few milliseconds of data received from only four satellites and without any information about approximate position of the receiver. Specifically, according to the present disclosure, TTFF can be improved using only the following data: measurements derived from a few milliseconds of data received from up to four satellites (e.g., a number of satellites less than five), valid almanac data, valid ephemeris data, and approximate current time accurate to less than one hour. Accordingly, in one aspect, the systems and methods of the present disclosure improve TTFF by utilizing data from only four satellites instead of five satellites, and by utilizing current time that is accurate to less than one hour instead of requiring time that is accurate to less than one minute. Further, in one aspect, the systems and methods improve TTFF without requiring any position information of the receiver. Instead, a search procedure is used to determine approximate position of the receiver. A Viterbi-like method is used to resolve millisecond ambiguity in pseudo-range measurements to accurately determine the position of the receiver.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
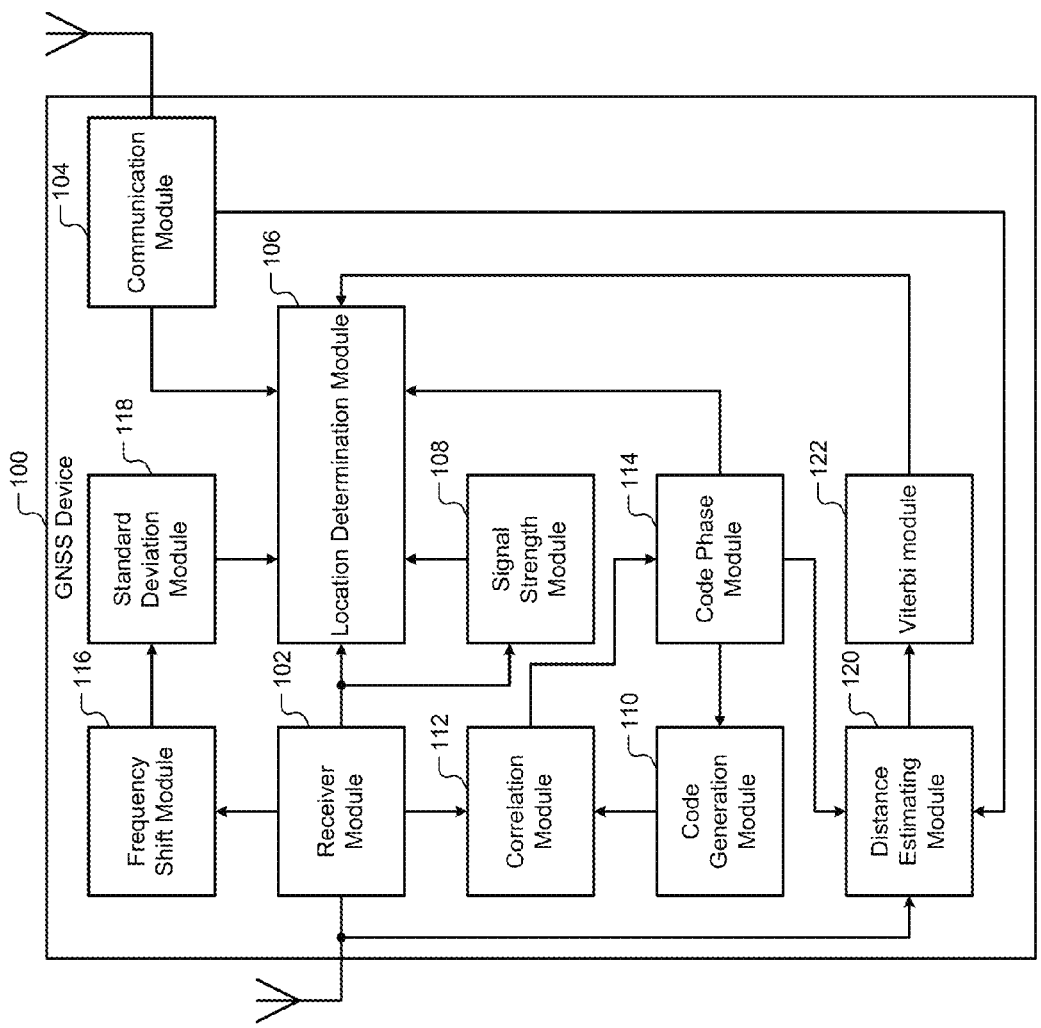
FIG. 1 is a functional block diagram of a global navigation satellite system (GNSS) device according to an embodiment of the present disclosure.

The time required for a receiver to determine a location of the receiver based on signals respectively acquired from a plurality of satellites is commonly referred to as the Time To First Fix (TTFF). TTFF can be determined from ephemeris data (i.e., orbital information) of satellites. Ephemeris data of a GPS satellite is typically valid up to four hours. Availability of ephemeris data greatly impacts TTFF.

TTFF is generally categorized into three start-up scenarios: a cold start, a hot start, and a warm start. In a cold start (e.g., when a receiver is first turned on after purchase or after a long time of nonuse), a receiver has no knowledge of the time and location, and has no valid ephemeris data. In order to determine a location of the receiver in a cold start scenario, a receiver must first acquire a satellite signal, and upon acquiring a satellite signal, the receiver can begin to obtain approximate information on all the other satellites (referred to herein as "almanac data"). This almanac data is transmitted repeatedly over 12.5 minutes in GPS system. Almanac data can be received from any of the GPS satellites and is valid for up to 7 days. Accordingly, TTFF in a cold start is relatively slow (e.g., few tens of seconds, approximately 30 seconds or more or longer depending on signal strength).

In a hot start, a receiver has valid time, position, almanac data, and ephemeris data, which permits the receiver to rapidly acquire satellite signals and, therefore, determine a position of the receiver without downloading ephemeris data again. Accordingly, TTFF in a hot start scenario is relatively fast (e.g., less than one second in open sky).

In a warm start, a receiver has a rough estimate of the current time (e.g., accurate to a few seconds), a rough estimate of the current position (e.g., accurate to a few hundred kilometers), and valid almanac data; however, the receiver does not have valid ephemeris data. Accordingly, TTFF in a warm start (e.g., more than 18 seconds) is less than TTFF in a cold start but greater than TTFF in a hot start.

TTFF can be improved by turning a warm start into a hot start. Conventionally, turning a warm start into a hot start typically requires at least the following data: measurements derived from a few milliseconds of data received from five or more satellites, valid almanac data, valid ephemeris data, approximate current time accurate to less than one minute, and approximate current position accurate to less than 30 km.

In one aspect, the present disclosure relates to systems and methods for improving TTFF using measurements derived from a few milliseconds of data received from only four satellites and without any information about approximate position of the receiver. Specifically, according to the present disclosure, TTFF can be improved using only the following data: measurements derived from a few milliseconds of data received from up to four satellites (e.g., a number of satellites less than five), valid almanac data, valid ephemeris data, and approximate current time accurate to less than one hour. Accordingly, in one aspect, the systems and methods of the present disclosure improve TTFF by utilizing data from only four satellites instead of five satellites, and by utilizing current time that is accurate to less than one hour instead of requiring time that is accurate to less than one minute. Further, in one aspect, the systems and methods improve TTFF without requiring any position information of the receiver.

FIG. 1 shows a GNSS device 100 (receiver) according to an embodiment of the present disclosure. The GNSS device 100 includes a receiver module 102, a communication module 104, and a location determination module 106. In operation, upon the GNSS being activated (e.g., turned on or started), the receiver module 102 acquires signals from up to four satellites within a predetermined period of time. The activation of the GNSS device 100 can correspond to a cold start, a hot start, or a warm start, as discussed above. For example, in a warm start, the GNSS device 100 may not have valid ephemeris data for one or more of the four satellites. The predetermined period of time by which the GNSS device 100 acquires the signals from up to four satellites is typically on the order of milliseconds. For example, the predetermined period of time can be within the range of 2 ms to 10 ms (e.g., 6 ms).

The communication module 104 obtains, subsequent to the GNSS device 100 being turned on, the ephemeris data of the satellites from a server (not shown). In one embodiment, the communication module 104 obtains the ephemeris data only for satellites having expired ephemeris data. The communication module 104 obtains the ephemeris data from the server via a cellular network and/or a wireless network. In one embodiment, the communication module 104 also obtains almanac data from the server. The location determination module 106 determines a position of the GNSS device 100 based on the signals received from the satellites, and the ephemeris data received from the server. In one embodiment, the location determination module 106 further utilizes the almanac data to determine a position of the GNSS device 100.

As explained below, in one embodiment, the location determination module 106 determines a position of the GNSS device 100 by utilizing one or more of three measurements derived from the signals received from the satellites: code phase, Doppler frequency shift, and signal strength of the signals received from the satellites. In addition, the location determination module 106 utilizes the ephemeris data received from the server, and a rough estimate of current time stored in the GNSS device 100. In one embodiment, the GNSS device 100 stores a current time prior to the GNSS device 100 being turned off (or at least the GPS components of the GNSS device 100 being turned off or going into a sleep mode). The time stored (and maintained) by the GNSS device 100 can later be used by the location determination module 106 as a rough estimate of the current time. The location determination module 106 determines a position of the GNSS device 100 by determining approximate position, obtaining pseudo-ranges (approximate distances between the GNSS device 100 and the satellites), and estimating time offset and accurate user position (i.e., position of the GNSS device 100) as explained below.

In one embodiment, the location determination module 106 determines an approximate position of the GNSS device 100 as follows. The location determination module 106 determines an approximate position of the GNSS device 100 at three levels of accuracy: very rough (accurate to within a few thousand kilometers), rough (accurate to less than 300 km), and approximate (accurate to within a few tens of kilometers).

In one embodiment, the location determination module 106 determines the very rough position of the GNSS device 100 as follows. The location determination module 106 estimates an approximate position of the GNSS device 100 relative to each of four satellites based on ephemeris data received from the server and the rough estimate of time stored in the GNSS device 100. The location determination module 106 determines the very rough position of the GNSS device 100 by averaging the estimates. The very rough position, however, is accurate to a few thousand kilometers. The accuracy can be improved to less than 1000 km as follows.

A signal strength module 108 measures signal strengths of the signals received from the four satellites. The location determination module 106 generates a weighted average of the estimates using the signal strengths. The weighted average represents a rough position of the GNSS device 100. Using the rough position determined based on the ephemeris data received from the server and the rough estimate of time stored in the GNSS device 100 as a starting point, the location determination module 106 uses a search procedure (described below in connection with FIG. 2) to further narrow down the uncertainty of the rough position (e.g., to less than 300 km). In one embodiment, the uncertainty of the position of the GNSS device 100 can be further narrowed down, e.g., to less than a few tens of kilometers.

Figure 2:
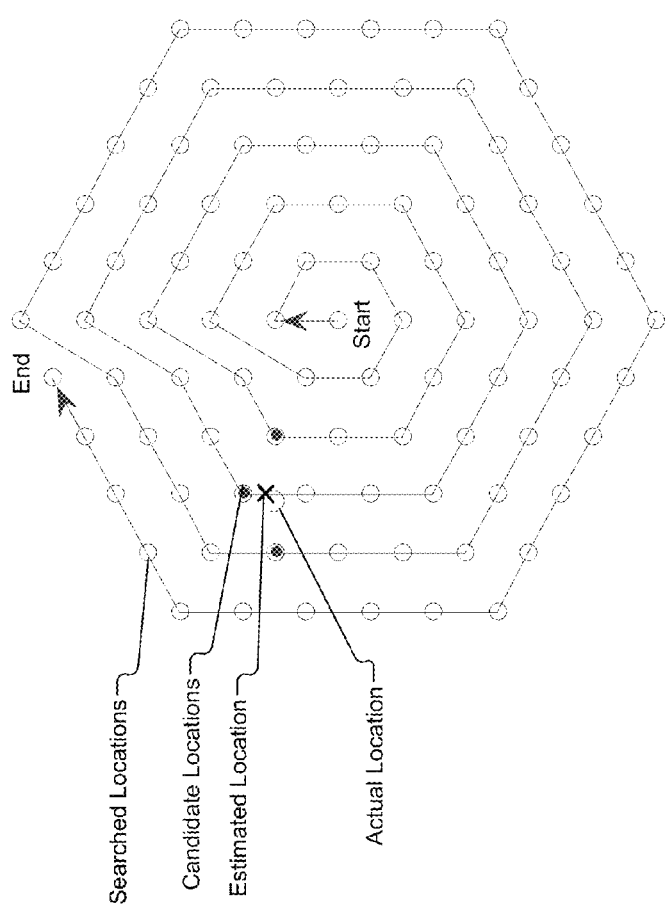
FIG. 2 depicts a search procedure used to determine an approximate position of a GNSS device according to an embodiment of the present disclosure.

FIG. 2 shows a search procedure used by the location determination module 106 according to one embodiment of the present disclosure. Before describing the search procedure, the processes of determining parameters called code phase and Doppler frequency shift, which are utilized by the search procedure, are explained below.

The satellites transmit signals using code division multiple access (CDMA). Each satellite transmits a unique code that repeats every millisecond. A code generation module 110 generates replicas of signals received from the satellite. A correlation module 112 correlates a signal received (or acquired) from a satellite with a replica of the signal generated by the code generation module 110. A code phase module 114 shifts the phase of the signal generated by the code generation module 110 until the correlation module 112 finds a correlation between the signal received from the satellite and the replica of the signal generated by the code generation module 110.

The amount by which the code phase module 114 shifts the phase of the signal generated by the code generation module 110 to achieve the correlation is referred to as "code phase". Since the signals received from the satellites include a Doppler frequency shift, the code phase may not differ by an integer number of milliseconds. Instead, the code phase may include an integer (millisecond or msec) portion and a non-integer (sub-millisecond or sub-msec) portion.

The frequency shift module 116 measures a Doppler frequency shift observed at a position of the GNSS device 100. The frequency shift module 116 measures the Doppler frequency shift between the signal received from one of the satellites and a corresponding signal generated by the code generation module 110. In addition, the frequency shift module 116 calculates Doppler frequency shifts at a plurality of different positions as follows.

The location determination module 106 selects a plurality of different positions around the determined rough position of the GNSS device 100, where (in one embodiment) adjacent positions are separated by a predetermined distance. The predetermined distance can be a user-selectable parameter that determines the certainty (accuracy) of the position estimated using the search procedure. For example, the predetermined distance may be 150 km, 75 km, and so on. The smaller the predetermined distance, the greater the certainty (accuracy) of the estimated position. The frequency shift module 116 calculates Doppler frequency shifts at the plurality of positions.

A standard deviation module 118 determines standard deviations between the observed Doppler frequency shift and the calculated Doppler frequency shifts. The location determination module 106 selects up to three of the positions as candidate positions, where the three candidate positions have standard deviations less than or equal to a predetermined threshold. For example, the standard deviations at the three candidate positions are less than the standard deviations at other positions. The location determination module 106 generates a weighted average of the candidate positions. The weighted average represents the approximate position of the GNSS device 100.

Mathematically, the location search criterion is defined as follows:

$$\sigma_{k,p} = \text{std}(D_{k,c} - D_{p,o})$$

where $D_{p,o}$ is observed Doppler frequency shift at position p, where position p is unknown; and $D_{k,c}$ is calculated Doppler frequency shift at a candidate position k. The smaller $\sigma_{k,p}$, the closer the selected position k is to an actual position p.

Using the search procedure, the location determination module 106 determines an estimated position of the GNSS device 100 as follows. The location determination module 106 calculates $\sigma_{k,p}$ at each position k. The location determination module 106 selects three candidate positions with smallest values of $\sigma_{k,p}$. The location determination module 106 generates a weighted average of the three candidate positions as follows:

$$r = \sum_{k=1}^{3} r_k \cdot \frac{1}{\sigma_{k,p}}$$

where $r_k$ represents the candidate positions. The weighted average r is the estimated position of the GNSS device 100.

A distance estimating module 120 obtains pseudo-ranges and a Viterbi module 122 resolves millisecond ambiguity in the pseudo-ranges as follows. Pseudo-ranges are approximate distances between the GNSS device 100 and the four satellites. The pseudo-ranges are expressed in units of milliseconds. Actual distances are calculated by multiplying the measurements in milliseconds by the speed of light.

The distance estimating module 120 generates calculated pseudo-range for each satellite using the following equation:

$$\tilde{\rho} = \tilde{t}_{tor} - \hat{t}_{tot}$$
$$= \tilde{t}_{tor} - (\hat{t}_{int\_tot} + subms)$$
$$= (\tilde{t}_{tor} - \hat{t}_{int\_tot} - 1) + (1 - subms)$$
$$= \text{Int1\_ms} + (1 - subms)$$

where $\tilde{t}_{tor}$ is time of reception of a signal from a satellite in milliseconds, $\tilde{t}_{tot}$ is time of transmission of the signal from the satellite in milliseconds, $\tilde{\rho}$ is pseudo-range in milliseconds, and Int1_ms is integer number of milliseconds. The value of the term (1−subms) may be between zero and 1 ms.

Additionally, the distance estimating module 120 generates observed pseudo-ranges using the following equation:

$$\tilde{\rho} = R - \Delta T_s + \Delta T_r + \ldots$$
$$= R - \Delta T_s + (\text{Int2\_ms} + \Delta t_r) +$$
$$= R - \Delta T_s + \text{Int2\_ms} + \Delta t_r$$
$$= (\text{Int3\_ms\_R} + \Delta R) - \Delta T_s + \text{Int1\_ms} + \Delta t_r$$
$$= (\text{Int3\_ms\_R} + \text{Int2\_ms}) + (\Delta R - \Delta T_s + \Delta t_r)$$
$$= \text{Int4\_ms} + (\Delta R - \Delta T_s + \Delta t_r)$$

where R is a geometric range (geometric distance between the GNSS device 100 and a satellite) in milliseconds, $\Delta T_s$ is clock bias of satellite clock (satellite clock bias) in milliseconds, $\Delta T_r$ is clock bias of receiver clock (receiver clock bias) in milliseconds, and $\Delta R$ and $\Delta t_r$ are respectively sub-millisecond portions of the geometric range and the receiver clock bias.

The distance estimating module 120 determines and uncertainty range of the pseudo-range for each satellite from the calculated, and observed pseudo-ranges as follows:

Int1_ms=Int4_ms+floor(($\Delta R-\Delta T_s+\Delta t_r$)−(1−subms))

The value of $\Delta R$ ranges between 0 and 1 ms. The value of $\Delta T_s$ ranges between −1 to 1 ms. The value of $\Delta t_r$ ranges between 0 and 1 ms. The value of (1−subms) ranges between 0 and 1 ms. Accordingly, the uncertainty or ambiguity in the pseudo-range ranges between −2 and 3 ms. The full pseudo-range can be expressed as follows:

PR=Int4_ms+(1−subms)

with ambiguity of integer milliseconds between (−2, 3).

Figure 3:
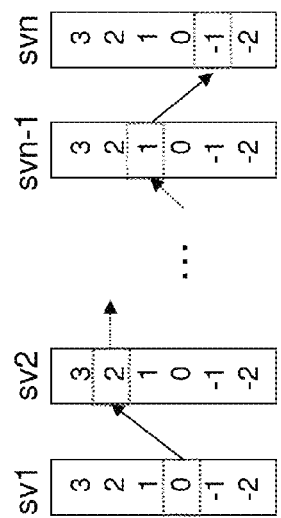
FIG. 3 depicts a Viterbi-like method used to resolve millisecond ambiguity in pseudo-range measurements according to an embodiment of the present disclosure.

FIG. 3 shows the manner in which the Viterbi module 122 resolves the uncertainty using Viterbi algorithm. In FIG. 3, SV denotes a satellite vehicle (also referred to herein generally as "satellite"). For the first satellite (SV1), the Viterbi module 122 selects 0 ms as integer ms candidate and calculates a cost function L(1)=PR(1)−R(1)+Ts(1).

For the second satellite (SV2), the Viterbi module 122 selects integer ms candidates in the following search sequence: 0 ms, then (−1, 1), then (−2, 2), and then 3 ms. For each integer ms candidate, the Viterbi module 122 calculates the cost function L(2)=PR(2)−R(2)+Ts(2) and determines if the standard deviation between the cost function for the first satellite and the cost function for the second satellite (i.e., SD(L(1:2))) is less than the predetermined distance between locations used in the search procedure (e.g., 150 km, 75 km, and so on). If the standard deviation SD(L(1:2)) is less than the predetermined distance, the Viterbi module 122 accepts the integer ms and proceeds to the next satellite. If the standard deviation SD(L(1:2)) is not less than the predetermined distance, the Viterbi module 122 tries the next integer ms (e.g., −1, 1, −2, −2, and 3).

For the last satellite (SVn), or each integer ms candidate, the Viterbi module 122 calculates the cost function L(n)=PR(n)−R(n)+Ts(n) and determines if the standard deviation between the cost function for the first satellite and the cost function for the n$^{th}$ satellite (i.e., SD(L(1:n))) is less than the predetermined distance between positions used in the search procedure. If the standard deviation SD(L(1:n)) is less than the predetermined distance, the Viterbi module 122 accepts the integer ms. If the standard deviation SD(L(1:n)) is not less than the predetermined distance, the Viterbi module 122 tries the next integer ms (e.g., −1, 1, −2, −2, and 3).

In this manner, the Viterbi module 122 finds an optimal path from the first satellite to the last satellite. For example, in FIG. 3, suppose the number of satellites is four (i.e., n=4), and suppose further that the standard deviations for the second, third, and fourth satellites were less than the predetermined distance for integer ms candidates 2, 1, and −1 as shown. In other words, suppose that the Viterbi module 122 finds an optimal path from the first satellite to the fourth satellite as the path connecting integer ms candidates 0, 2, 1, and −1 as shown. Then the integer number of ms (Int1_ms) is 0 for the first satellite, 2 for the second satellite, 1 for the third satellite, and −1 for the fourth satellite. With ambiguity resolved as above, the location determination module 106 calculates the pseudo-ranges with certainty.

The location determination module 106 estimates time offset and accurate user position (i.e., position of the GNSS device 100) as follows. The location determination module 106 calculates the geometric range using the following equation:

$$R = |r_s(t) - r|$$
$$\approx R_0 - \frac{r_s(t) - r}{R_0} \cdot \Delta r - \frac{r_s(t) - r}{R_0} \cdot \dot{r}_s(t) \cdot \Delta t$$
$$= R_0 - \frac{r_s(t) - r}{R_0} \cdot \Delta r - \dot{R}_0 \cdot \Delta t$$

where $r_s(t)$ is the location of a satellite (satellite position) at time t, $\dot{r}_s(t)$ is the velocity of the satellite (satellite velocity) at time t, r is approximate user location, $R_0$ is calculated approximate geometric range, and $\Delta r$ and $\Delta t$ are respectively corrections to user position (i.e., position of the GNSS device) and time.

The location determination module 106 estimates an accurate position of the user using the following equation for each of the four satellites:

$$\tilde{\rho} = R - \Delta t_s + \Delta T_r$$
$$\approx \left(R_0 - \frac{r_s(t) - r}{R_0} \cdot \Delta r - \dot{R}_0 \cdot \Delta t\right) - \Delta t_s + \Delta T_r$$

The position of the user (i.e., position of the GNSS device) r has three unknowns (x, y, and z coordinates (i.e., longitude, latitude, and altitude)). Additionally, $\Delta T_s$ and $\Delta T_r$ are also unknown. Accordingly, a fifth equation for a virtual satellite, which is assumed at the center of Earth, can be used as follows:

$$\tilde{\rho} = R$$
$$\approx \left(R_0 - \frac{0 - r}{R_0} \cdot \Delta r\right)$$
$$= R_0 + \frac{r}{R_0} \cdot \Delta r$$

These five equations can be solved to obtain values of the five unknowns. Thus, the location determination module 106 determines an accurate position of the user.

Figure 4:
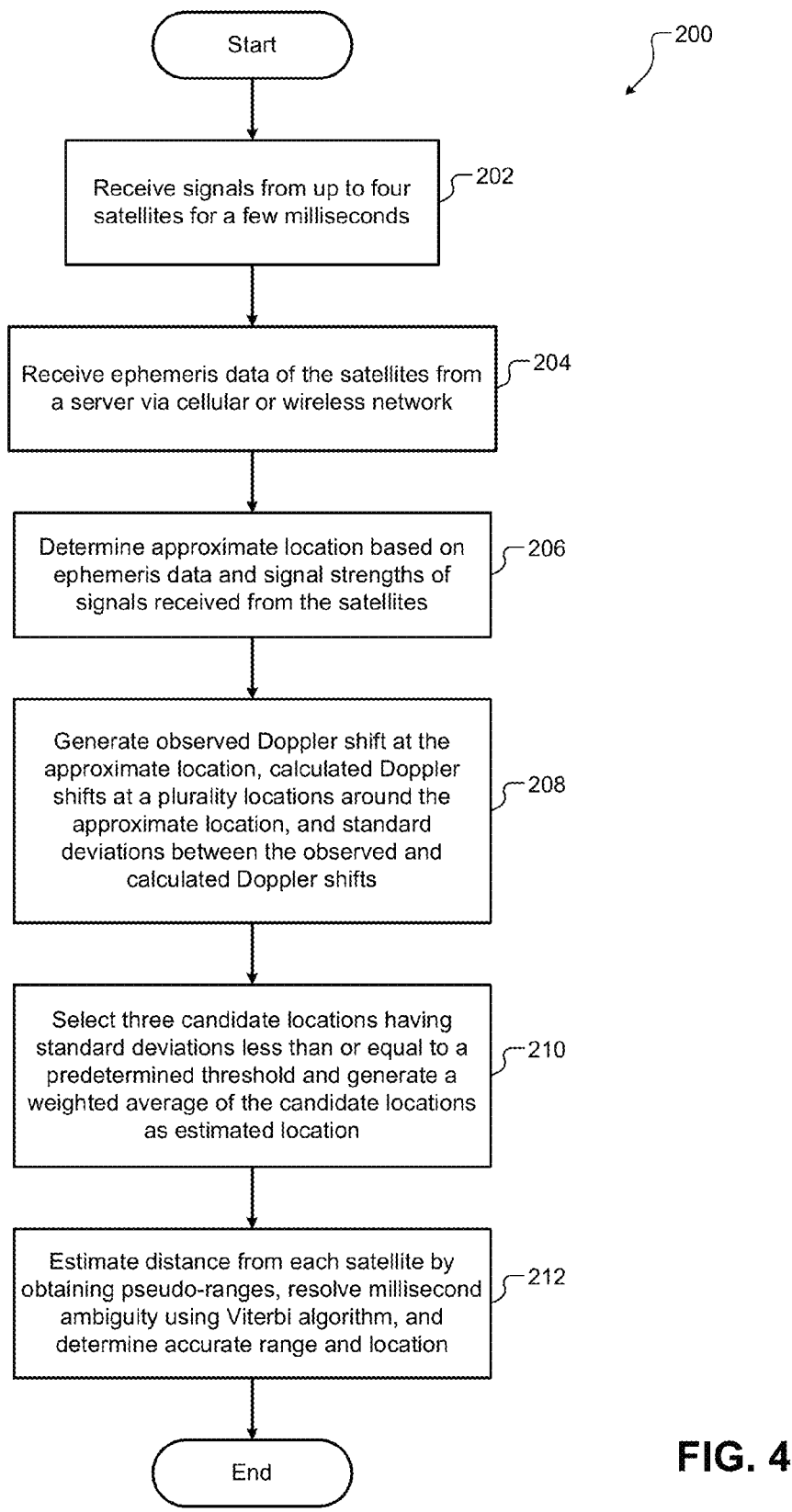
FIG. 4 is a flowchart of a method for determining an approximate position of a GNSS device according to an embodiment of the present disclosure.

FIG. 4 shows a method 200 for determining a position of a GNSS device (e.g., GNSS device 100) according to one embodiment of the present disclosure. At 202, control receives signals from up to four satellites for a period of a few milliseconds. In one embodiment, the "control" referred to herein is implemented by one or more components of a GNSS device—e.g., a receiver module, a communication module, and/or a location determination module. At 204, control receives ephemeris data of the satellites from a server via a cellular network and/or a wireless network (e.g., a WiFi network). At 206, control determines an approximate position of the GNSS device based on the ephemeris data and signal strengths of the signals received from the satellites. At 208, control generates observed Doppler shift at the approximate position, calculated Doppler shifts at a plurality of different positions surrounding the approximate position, and standard deviations between the observed and calculated Doppler shifts. At 210, control selects three candidate positions having standard deviations less than or equal to a predetermined threshold, and generates a weighted average of the candidate positions as the estimated position of the GNSS device. At 212, control estimates a distance between the GNSS device and each satellite by obtaining pseudo-ranges, resolves millisecond ambiguity using Viterbi algorithm, and determines a more accurate position of the GNSS device.

In summary, according to one aspect of the present disclosure, signals from only four or less satellites are used to determine the location of a GNSS device. No a priori knowledge of approximate position (e.g., rough position) of the GNSS device is required. Instead, a search procedure is used to determine approximate position of the GNSS device. A Viterbi-like method is used to resolve millisecond ambiguity in pseudo-range measurements to accurately determine the position of the GNSS device.

The teachings of the present disclosure are not limited to GNSS only. For example, the teachings of the present disclosure can be utilized to determine locations of GPS devices. The teachings of the present disclosure can also be used in multi-function radios that include GPS or GNSS devices.

Further aspects of the present disclosure relate to one or more of the following clauses. A system for determining a position of a device comprises a receiver module, a communication module, and a location determining module. The receiver module is configured to respectively acquire signals from a plurality of satellites totaling in number less than five. The communication module is configured to obtain, from a server, ephemeris data corresponding to one or more of the plurality of satellites totaling in number less than five. The ephemeris data corresponding to the one or more of the plurality of satellites totaling in number less than five is obtained by the communication module from the server via (i) a cellular network or (ii) a wireless network. The location determining module is configured to determine the position of the device based, at least in part, on (i) the signals acquired from the plurality of satellites totaling in number less than five, and (ii) the ephemeris data corresponding to the one or more of the plurality of satellites totaling in number less than five obtained from the server. The position of the device is further determined without a priori knowledge regarding the position of the device.

In another feature, the receiver module is configured to respectively acquire the signals from the plurality of satellites totaling in number less than five within a predetermined time period.

In another feature, the predetermined time period is (i) at least two milliseconds and (ii) less than or equal to 10 milliseconds.

In another feature, the location determining module is configured to generate estimates of an approximate position of the device relative to each of the plurality of satellites totaling in number less than five based, at least in part, on the ephemeris data corresponding to the one or more of the plurality of satellites totaling in number less than five from the server, and an estimate of current time; and determine the position of the device by averaging the estimates.

In another feature, the system further comprises a signal strength module configured to respectively determine a signal strength of each of the signals acquired from the plurality of satellites totaling in number less than five.

In another feature, the system further comprises an averaging module configured to generate a weighted average of the estimates based on the signal strength of each of the signals acquired from the plurality of satellites totaling in number less than five, where the weighted average represents the position of the device.

In another feature, the system further comprises a frequency shift module configured to measure a Doppler frequency shift observed at the position of the device between (i) a signal acquired from one of the plurality of satellites totaling in number less than five and (ii) a corresponding signal generated by the device, and calculate Doppler frequency shifts at a plurality of different positions around position of the device as determined by the location determining module. Adjacent ones of the plurality of different positions are separated by a predetermined distance.

In another feature, the system further comprises a standard deviation module configured to determine standard deviations between the observed Doppler frequency shift and the calculated Doppler frequency shifts.

In another feature, the location determining module is configured to select, as candidate positions, up to three of the positions having standard deviation less than or equal to a predetermined threshold, and generate a weighted average of the candidate positions, wherein the weighted average of the candidate positions corresponds to a more accurate position of the device. An accuracy of the more accurate position of the device is a function of the predetermined distance.

In another feature, the system further comprises a distance estimating module configured to estimate a distance between one of the plurality of satellites totaling in number less than five and the device based on (i) a time of transmission of a signal from the one of the plurality of satellites totaling in number less than five, (ii) a time of reception of the signal at the device, (iii) a clock bias of the one of the plurality of satellites totaling in number less than five, and (iv) a clock bias of the device; and a Viterbi module configured to resolve an uncertainty in the estimated distance using a Viterbi algorithm.

In still other features, a method for determining a position comprises respectively acquiring signals from a plurality of satellites totaling in number less than five. The method further comprises obtaining, from a server, ephemeris data corresponding to one or more of the plurality of satellites totaling in number less than five. The ephemeris data corresponding to the one or more of the plurality of satellites totaling in number less than five is obtained from the server via (i) a cellular network or (ii) a wireless network. The method further comprises determining the position of the device based, at least in part, on (i) the signals acquired from the plurality of satellites totaling in number less than five, and (ii) the ephemeris data corresponding to the one or more of the plurality of satellites totaling in number less than five obtained from the server. The position of the device is further determined without a priori knowledge regarding the position of the device.

In another feature, the respectively acquiring the signals from the plurality of satellites totaling in number less than five is performed within a predetermined time period.

In another feature, the predetermined time period is (i) at least two milliseconds and (ii) less than or equal to 10 milliseconds.

In another feature, the method further comprises generating estimates of an approximate position of the device relative to each of the plurality of satellites totaling in number less than five based, at least in part, on the ephemeris data corresponding to the one or more of the plurality of satellites totaling in number less than five from the server, and an estimate of current time; and determining the position of the device by averaging the estimates.

In another feature, the method further comprises respectively determining a signal strength of each of the signals acquired from the plurality of satellites totaling in number less than five.

In another feature, the method further comprises generating a weighted average of the estimates based on the signal strength of each of the signals acquired from the plurality of satellites totaling in number less than five, where the weighted average represents the position of the device.

In another feature, the method further comprises measuring a Doppler frequency shift observed at the position of the device between (i) a signal acquired from one of the plurality of satellites totaling in number less than five and (ii) a corresponding signal generated by the device; and calculating Doppler frequency shifts at a plurality of different positions around position of the device. Adjacent ones of the plurality of different positions are separated by a predetermined distance.

In another feature, the method further comprises determining standard deviations between the observed Doppler frequency shift and the calculated Doppler frequency shifts.

In another feature, the method further comprises selecting, as candidate positions, up to three of the positions having standard deviation less than or equal to a predetermined threshold; and generating a weighted average of the candidate positions, wherein the weighted average of the candidate positions corresponds to a more accurate position of the device. An accuracy of the more accurate position of the device is a function of the predetermined distance.

In another feature, the method further comprises estimating a distance between one of the plurality of satellites totaling in number less than five and the device based on (i) a time of transmission of a signal from the one of the plurality of satellites totaling in number less than five, (ii) a time of reception of the signal at the device, (iii) a clock bias of the one of the plurality of satellites totaling in number less than five, and (iv) a clock bias of the device; and resolving an uncertainty in the estimated distance using a Viterbi algorithm.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system for determining a position of a device, the system comprising:
   a receiver module configured to respectively acquire signals from a plurality of satellites totaling in number less than five;
   a communication module configured to obtain, from a server, ephemeris data corresponding to one or more of the plurality of satellites totaling in number less than five, wherein the ephemeris data corresponding to the one or more of the plurality of satellites totaling in number less than five is obtained by the communication module from the server via (i) a cellular network or (ii) a wireless network;
   a location determining module configured to generate estimates of an approximate position of the device relative to each of the plurality of satellites totaling in number less than five, without using prior position data of the device, based on
   (i) the signals acquired from the plurality of satellites totaling in number less than five, and
   (ii) the ephemeris data corresponding to the one or more of the plurality of satellites totaling in number less than five obtained from the server;
   a signal strength module configured to respectively determine a signal strength of each of the signals acquired from the plurality of satellites totaling in number less than five; and
   an averaging module configured to generate a weighted average of the estimates based on the signal strength of each of the signals acquired from the plurality of satellites totaling in number less than five, wherein the weighted average represents the position of the device.

2. The system of claim 1, wherein the receiver module is configured to respectively acquire the signals from the plurality of satellites totaling in number less than five within a predetermined time period.

3. The system of claim 2, wherein the predetermined time period is (i) at least two milliseconds and (ii) less than or equal to 10 milliseconds.

4. The system of claim 1, further comprising a frequency shift module configured to:
   measure a Doppler frequency shift observed at the position of the device between (i) a signal acquired from one of the plurality of satellites totaling in number less than five and (ii) a corresponding signal generated by the device, and
   calculate Doppler frequency shifts at a plurality of different positions around position of the device as determined by the location determining module, wherein adjacent ones of the plurality of different positions are separated by a predetermined distance.

5. The system of claim 4, further comprising a standard deviation module configured to determine standard deviations between the observed Doppler frequency shift and the calculated Doppler frequency shifts.

6. The system of claim 5, wherein the location determining module is configured to:
select, as candidate positions, up to three of the positions having standard deviation less than or equal to a predetermined threshold, and
generate a weighted average of the candidate positions, wherein the weighted average of the candidate positions corresponds to a more accurate position of the device, wherein an accuracy of the more accurate position of the device is a function of the predetermined distance.

7. The system of claim 6, further comprising:
a distance estimating module configured to estimate a distance between one of the plurality of satellites totaling in number less than five and the device based on (i) a time of transmission of a signal from the one of the plurality of satellites totaling in number less than five, (ii) a time of reception of the signal at the device, (iii) a clock bias of the one of the plurality of satellites totaling in number less than five, and (iv) a clock bias of the device; and
a Viterbi module configured to resolve an uncertainty in the estimated distance using a Viterbi algorithm.

8. A method for determining a position of a device, the method comprising:
respectively acquiring signals from a plurality of satellites totaling in number less than five;
obtaining, from a server, ephemeris data corresponding to one or more of the plurality of satellites totaling in number less than five, wherein the ephemeris data corresponding to the one or more of the plurality of satellites totaling in number less than five is obtained from the server via (i) a cellular network or (ii) a wireless network;
generating estimates of an approximate position of the device relative to each of the plurality of satellites totaling in number less than five, without using prior position data of the device, based on
(i) the signals acquired from the plurality of satellites totaling in number less than five, and
(ii) the ephemeris data corresponding to the one or more of the plurality of satellites totaling in number less than five obtained from the server;
determining a signal strength of each of the signals acquired from the plurality of satellites totaling in number less than five; and
generating a weighted average of the estimates based on the signal strength of each of the signals acquired from the plurality of satellites totaling in number less than five, wherein the weighted average represents the position of the device.

9. The method of claim 8, wherein the respectively acquiring the signals from the plurality of satellites totaling in number less than five is performed within a predetermined time period.

10. The method of claim 9, wherein the predetermined time period is (i) at least two milliseconds and (ii) less than or equal to 10 milliseconds.

11. The method of claim 8, further comprising:
measuring a Doppler frequency shift observed at the position of the device between (i) a signal acquired from one of the plurality of satellites totaling in number less than five and (ii) a corresponding signal generated by the device; and
calculating Doppler frequency shifts at a plurality of different positions around position of the device, wherein adjacent ones of the plurality of different positions are separated by a predetermined distance.

12. The method of claim 11, further comprising determining standard deviations between the observed Doppler frequency shift and the calculated Doppler frequency shifts.

13. The method of claim 12, further comprising:
selecting, as candidate positions, up to three of the positions having standard deviation less than or equal to a predetermined threshold; and
generating a weighted average of the candidate positions, wherein the weighted average of the candidate positions corresponds to a more accurate position of the device, wherein an accuracy of the more accurate position of the device is a function of the predetermined distance.

14. The method of claim 13, further comprising:
estimating a distance between one of the plurality of satellites totaling in number less than five and the device based on (i) a time of transmission of a signal from the one of the plurality of satellites totaling in number less than five, (ii) a time of reception of the signal at the device, (iii) a clock bias of the one of the plurality of satellites totaling in number less than five, and (iv) a clock bias of the device; and
resolving an uncertainty in the estimated distance using a Viterbi algorithm.

* * * * *